United States Patent
Franks et al.

(10) Patent No.: US 10,478,846 B2
(45) Date of Patent: Nov. 19, 2019

(54) DYNAMIC COATING THICKNESS MEASUREMENT AND CONTROL

(71) Applicant: Lockheed Martin Corporation, Bethesda, MD (US)

(72) Inventors: Ron K. Franks, Crowley, TX (US); Jeffrey T. Drewett, Kennedale, TX (US); Justin Marcel Solis, Fort Worth, TX (US); Tara Michelle Thomasson, Burleson, TX (US); Bobby Charles Dabbs, Boaz, AL (US)

(73) Assignee: Lockheed Martin Corporation, Bethesda, MD (US)

( * ) Notice: Subject to any disclaimer, the term of this patent is extended or adjusted under 35 U.S.C. 154(b) by 169 days.

(21) Appl. No.: 15/144,391

(22) Filed: May 2, 2016

(65) Prior Publication Data
US 2017/0312775 A1    Nov. 2, 2017

(51) Int. Cl.
| | |
|---|---|
| B05B 12/08 | (2006.01) |
| B05B 13/04 | (2006.01) |
| B05B 9/01 | (2006.01) |
| B05B 7/00 | (2006.01) |
| B25J 11/00 | (2006.01) |
| B05D 1/02 | (2006.01) |

(52) U.S. Cl.
CPC ............. *B05B 12/084* (2013.01); *B05B 9/01* (2013.01); *B05B 13/0431* (2013.01); *B05B 7/0018* (2013.01); *B05D 1/02* (2013.01); *B25J 11/0075* (2013.01); *Y10S 901/43* (2013.01)

(58) Field of Classification Search
None
See application file for complete search history.

(56) References Cited

U.S. PATENT DOCUMENTS

| | | | |
|---|---|---|---|
| 4,358,471 A | 11/1982 | Derkacs et al. | |
| 4,614,300 A | 9/1986 | Falcoff | |

(Continued)

FOREIGN PATENT DOCUMENTS

| | | |
|---|---|---|
| DE | 19756467 A1 | 7/1999 |
| DE | 102014019314 A1 | 6/2015 |

(Continued)

OTHER PUBLICATIONS

Extended European Search Report, Application No. 17167926.9, dated Sep. 22, 2017, 8 pages.

*Primary Examiner* — Michael P. Rodriguez
(74) *Attorney, Agent, or Firm* — Baker Botts L.L.P.

(57) ABSTRACT

In certain embodiments, a system comprises a robot, a spray gun coupled to the robot and operable to spray a first predefined number of passes of a material onto a substrate at a first flow rate, and a measurement device operable to measure one or more properties of the material sprayed onto the substrate while the material is wet. The system further comprises an analyzer operable to determine a thickness of the wet material based on the one or more measured properties and calculate a second flow rate required to achieve a cured thickness of the material within a second predefined number of passes. The calculated second flow rate is based on the first predefined number of passes, an expected thickness of the wet material for one pass of the first predefined number of passes, the determined thickness of the wet material, and the first flow rate.

8 Claims, 3 Drawing Sheets

(56) References Cited

U.S. PATENT DOCUMENTS

| | | | |
|---|---|---|---|
| 4,702,931 A | 10/1987 | Falcoff | |
| 4,977,853 A * | 12/1990 | Falcoff | G01B 7/023 |
| | | | 118/665 |
| 6,663,918 B2 | 12/2003 | Manning et al. | |
| 6,936,106 B2 | 8/2005 | Filev et al. | |
| 7,396,414 B2 | 7/2008 | Nesbitt | |
| 7,687,099 B2 | 3/2010 | Jarvis | |
| 7,758,910 B2 | 7/2010 | Moreau et al. | |
| 2006/0177566 A1 * | 8/2006 | Price | C23C 4/12 |
| | | | 427/8 |
| 2010/0148070 A1 * | 6/2010 | Ho | G01N 21/3581 |
| | | | 250/341.8 |
| 2012/0076923 A1 * | 3/2012 | Bucher | G01B 11/0608 |
| | | | 427/9 |
| 2012/0156362 A1 | 6/2012 | Sadovoy et al. | |
| 2014/0329001 A1 | 11/2014 | Rouaud et al. | |

FOREIGN PATENT DOCUMENTS

| | | | |
|---|---|---|---|
| EP | 2805774 A2 | 11/2014 | |
| EP | 2899499 A1 | 7/2015 | |

* cited by examiner

DYNAMIC COATING THICKNESS MEASUREMENT AND CONTROL

TECHNICAL FIELD

This disclosure relates generally to measuring coating thicknesses, and more specifically to systems and methods for dynamic coating thickness measurement and control.

BACKGROUND

Current techniques for measuring coating thicknesses are performed after the coating material has cured. Depending on the type of material, the curing period could take hours. If the cured coating thickness does not match the desired coating thickness, the coating may need to be sanded or reapplied, which requires further thickness measurements and may require additional curing time.

SUMMARY OF THE DISCLOSURE

In accordance with the present disclosure, disadvantages and problems associated with measuring coating thicknesses are reduced or eliminated.

In one embodiment, a system includes a robot, a spray gun coupled to the robot and operable to spray a first predefined number of passes of a material onto a substrate at a first flow rate, and a measurement device operable to measure one or more properties of the material sprayed onto the substrate while the material is wet. The system further includes an analyzer operable to determine a thickness of the wet material based on the one or more measured properties and calculate a second flow rate required to achieve a cured thickness of the material within a second predefined number of passes. The calculated second flow rate is based on the first predefined number of passes, an expected thickness of the wet material for one pass of the first predefined number of passes, the determined thickness of the wet material, and the first flow rate.

In some embodiments, a method includes spraying, by a spray gun coupled to a robot, a first predefined number of passes of a material onto a substrate at a first flow rate and measuring, by a measurement device, one or more properties of the material sprayed onto the substrate while the material is wet. The method further includes determining, by an analyzer, a thickness of the wet material based on the one or more measured properties and calculating, by the analyzer, a second flow rate required to achieve a cured thickness of the material within a second predefined number of passes. The calculated second flow rate is based on the first predefined number of passes, an expected thickness of the wet material for one pass of the first predefined number of passes, the determined thickness of the wet material, and the first flow rate.

In certain embodiments, an apparatus includes a robot and a spray gun coupled to the robot and operable to spray a first predefined number of passes of a material onto a substrate at a first flow rate. The apparatus also includes one or more computer processors configured to access data captured by a measurement device. The data includes one or more properties of the material sprayed onto the substrate by the spray gun during the first predefined number of passes, and the data is captured by the measurement device while the material is wet. The one or more computer processors are further configured to determine a thickness of the wet material based on the one or more measured properties and calculate a second flow rate required to achieve a cured thickness of the material within a second predefined number of passes. The calculated second flow rate is based on the first predefined number of passes, an expected thickness of the wet material for one pass of the first predefined number of passes, the determined thickness of the wet material, and the first flow rate.

A technical advantage of some embodiments of the disclosure includes determining a material thickness while the material is wet rather than waiting for the material to cure, which allows for in-process measurements. Another advantage of some embodiments includes measuring one or more properties of the wet material sprayed onto a substrate without physically contacting the wet material, which provides for non-destructive measurements.

As another advantage of certain embodiments, a material flow rate is adjusted during the spraying process to reduce or eliminate inaccuracies in the cured thickness of the material, which may save time and resources. For example, the flow rate may be reduced halfway through the coating process if the measured coating thickness is greater than an expected coating thickness at that point in the process, which may prevent the need to sand down the coating after the coating has cured. As another example, the flow rate may be increased halfway through the coating process if the measured coating thickness is less than an expected coating thickness at that point in the process, which may prevent the need to apply more coating material after the coating has cured.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 3, where like numbers are used to indicate like and corresponding parts.

In manufacturing, coating thicknesses are typically measured after the coating material applied to a surface has cured. For example, a small piece of coating may be removed from the surface after the coating has cured, and a micrometer may be used to mechanically measure the thickness of the removed piece of coating. As another example, an eddy-current device (e.g., a Fischerscope) may physically touch the coating after the coating has cured and measure the coating thickness using an electrical signal. Depending on the type of material, the curing period could take hours.

Also, if the measured coating thickness does not match the desired coating thickness, the coating may need to be sanded or reapplied, which requires further curing time and further measurements.

To reduce or eliminate these and other problems, some embodiments of the present disclosure include determining a thickness of a wet material sprayed onto a substrate rather than waiting for the material to cure, which allows for in-process measurements and increases efficiency. Another advantage of some embodiments includes measuring one or more properties of the material sprayed onto the substrate without contacting the wet material, which provides for non-destructive measurements.

As another advantage of certain embodiments, a material flow rate is adjusted during the spraying process to reduce or eliminate inaccuracies in the cured thickness of the material, which may save time and resources. For example, the flow rate may be reduced at a certain point during the coating process if the measured coating thickness is greater than an expected coating thickness at that point in the process, which may prevent the need to sand down the coating after the coating has cured. As another example, the flow rate may be increased at a certain point the coating process if the measured coating thickness is less than an expected coating thickness at that point in the process, which may prevent the need to apply more coating after the coating has cured.

Figure 1:
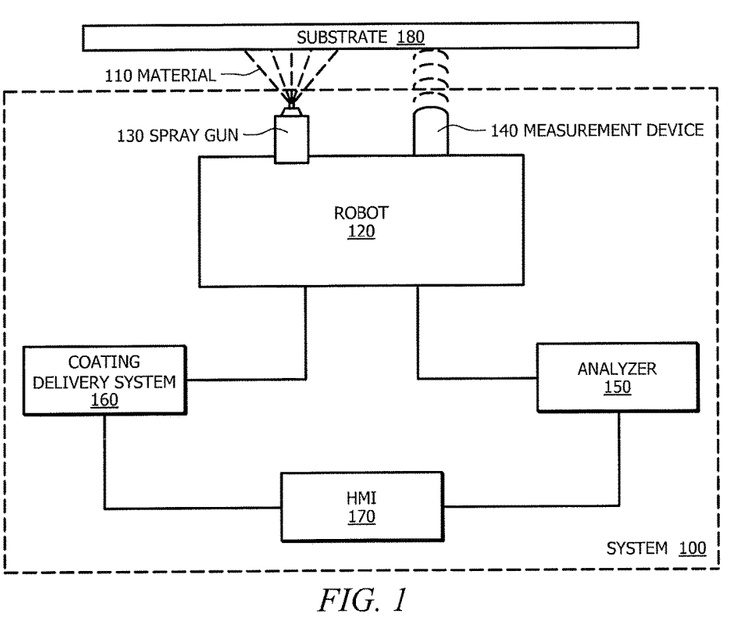
FIG. 1 illustrates a system for adjusting a flow rate of a material, according to certain embodiments.
Figure 2:
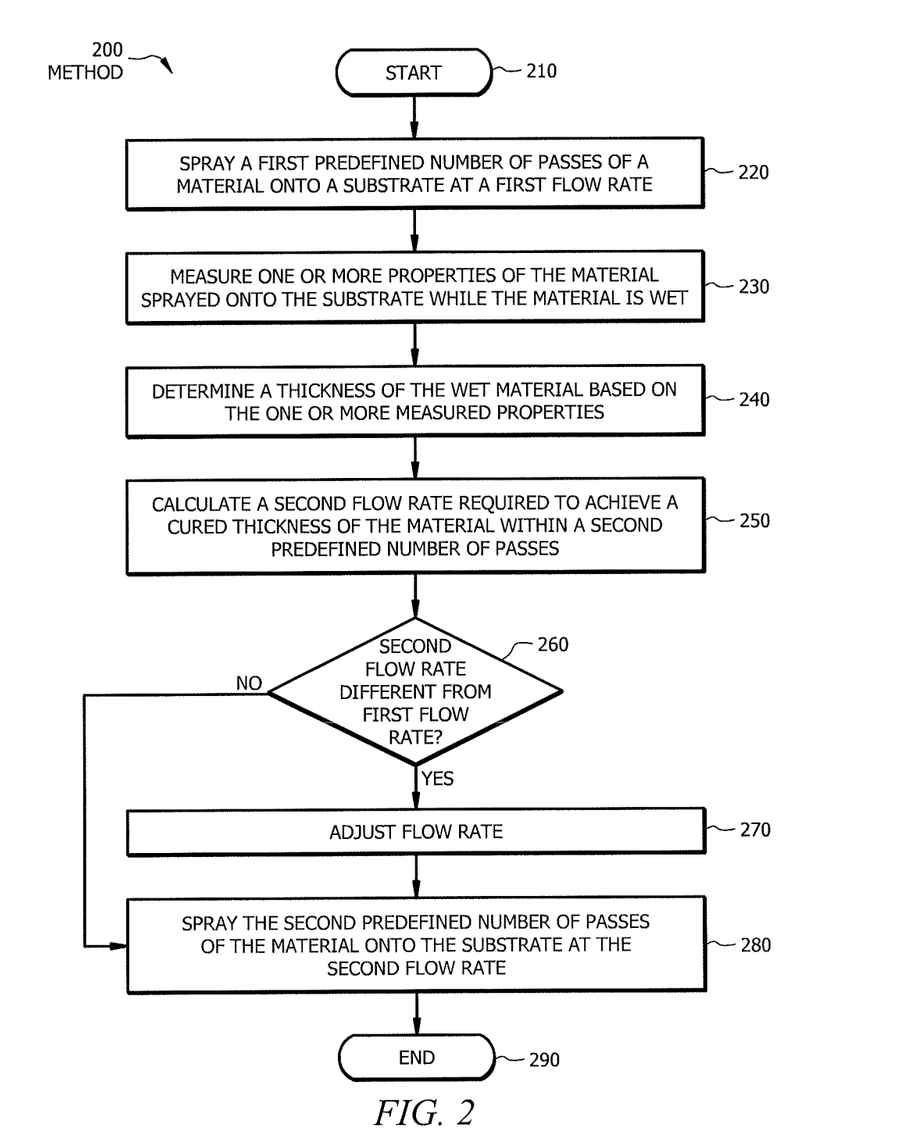
FIG. 2 illustrates a method for adjusting a flow rate of a material, according to certain embodiments.
Figure 3:
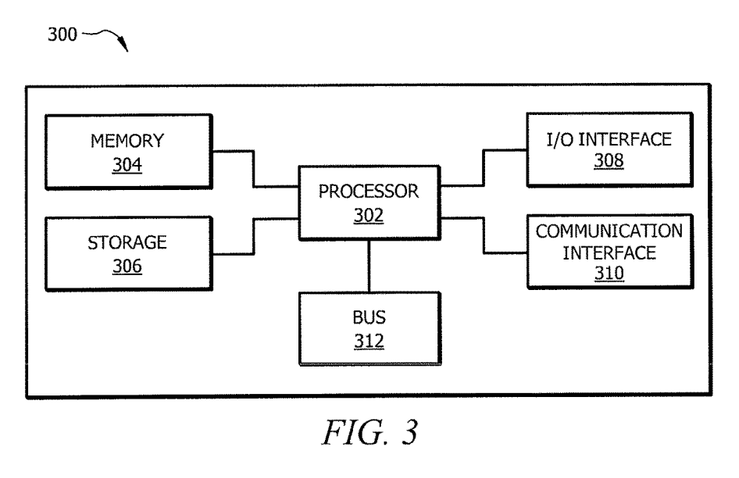
FIG. 3 illustrates a computer system that may be used by the system of FIG. 1, according to certain embodiments.

Other technical advantages will be readily apparent to one skilled in the art from the following figures, descriptions, and claims. Moreover, while specific advantages have been enumerated above, various embodiments may include all, some, or none of the enumerated advantages. FIGS. 1 through 3 provide additional details relating to systems and methods for dynamic coating thickness measurement and control.

FIG. 1 illustrates a system 100 for adjusting a flow rate of a material 110, according to certain embodiments. As shown in FIG. 1, system 100 may include a robot 120, a spray gun 130, a measurement device 140, an analyzer 150, a coating delivery system 160, and a Human-Machine Interface ("HMI") 170.

Robot 120 is any machine that can perform one or more functions automatically. In certain embodiments, robot 120 may be programmed by one or more computer systems (e.g., computer system 300) to spray material 110 onto a substrate 180. Material 110 is any material that can be sprayed onto substrate 180. For example, material 110 may be a liquid (e.g., paint). As another example, material 110 may be a combination of a gas and a liquid (e.g., foam). Substrate 180 is any substrate that can be sprayed with material 110. For example, substrate 180 may be a surface of a manufactured part.

In certain embodiments, robot 120 is programmed to spray a certain number of passes of material 110 onto substrate 180. For example, robot 120 may be programmed to spray ten passes of material 110 onto substrate 180. In some embodiments, robot 120 is programmed to wait a certain amount of time between passes. As an example, robot 120 may be programmed to wait ten minutes between passes. The wait time between passes may be constant or may vary.

System 100 may include one or more spray guns 130. Spray gun 130 is any device that can spray material 110 onto substrate 180. For example, spray gun 130 may be a conventional, high pressure spray gun 130 or a high-volume, low-pressure spray gun 130. In certain embodiments, spray gun 130 is a paint gun. As illustrated in the embodiment of FIG. 1, spray gun 130 may be coupled to robot 120. For example, spray gun 130 may be integrated with robot 120 such that spray gun 130 is permanently attached to robot 120. As another example, spray gun 130 may be fastened to robot 120 such that spray gun 130 can easily be detached from and reattached to robot 120. In general, spray gun 130 may be positioned in any appropriate manner in order to spray material 110 onto substrate 180.

In certain embodiments, spray gun 130 sprays a pre-defined number of passes of material 110. Multiple passes may be required to prevent surface-finish issues. For example, spraying a thick coat of paint in one pass may cause orange peel, porosity, solvent bubbling, and the like. In some embodiments, spray gun 130 waits a certain amount of time (i.e., flash time) between coats before over-coating the previous pass with the next pass. As an example, spray gun 130 may spray substrate 180 with a first pass of material 110, wait a certain flash time, and then spray substrate 180 with a second pass of material 110, creating two coats of material 110. Similarly, spray gun 130 may wait a certain flash time after spraying substrate 180 with the second pass of material 110 before spraying substrate 180 with a third pass.

In some embodiments, spray gun 130 sprays one or more passes (e.g., a first predetermined number of passes) at a first flow rate. The flow rate may be selected to achieve an expected coating thickness of material 110. For example, the first flow rate may be selected to achieve an expected coating thickness of one mil (i.e., one thousandth of an inch) after one pass. As another example, the first flow rate may be selected to achieve an expected coating thickness of ten mils after ten passes.

Spray gun 130 of system 100 may adjust the flow rate of material 110 dispensed from spray gun 130. In certain embodiments, spray gun 130 is programmed by a computer system (e.g., by computer system 300) to adjust a first flow rate of material 110 to a second flow rate of material 110. For example, spray gun 130 may be programmed to adjust a first flow rate of 150 cubic centimeters per minute ("cc/min") to a second flow rate of 250 cc/min. In certain embodiments, spray gun 130 adjusts the flow rate by adjusting the plume shape and/or the air pressure of spray gun 130.

Measurement device 140 of system 100 is any device that can measure one or more properties of material 110 sprayed onto substrate 180. In certain embodiments, measurement device 140 measures one or more properties of material 110 while material 110 is wet. For example, measurement device 140 may measure the thickness of paint sprayed on a manufactured part while the paint is wet. In some embodiments, measurement device 140 measures the one or more properties of material 110 without physically contacting material 110. Measurement device 140 may measure one or more properties of material 110 during one or more flash times between spray passes.

As illustrated in the embodiment of FIG. 1, measurement device 140 may be may be coupled to robot 120. For example, measurement device 140 may be integrated with robot 120 such that measurement device 140 is permanently attached to robot 120. As another example, measurement device 140 may be fastened to robot 120 such that measurement device 140 can be easily detached from and reattached to robot 120. In general, measurement device 140 may be positioned in any appropriate manner in order to measure one or more properties of material 110 sprayed onto substrate 180.

In certain embodiments, measurement device 140 is a probe (e.g., a microwave probe) that measures one or more electrical properties of material 110. For example, measurement device 140 may measure electrical performance data, such as reflectivity, of applied material 110 for certain frequency ranges, wherein the performance data indicates whether a coating thickness of the applied material (e.g., paint) is too thick, too thin, or at a proper thickness.

In certain embodiments, measurement device 140 is a sensor (e.g., a terahertz sensor). For example, measurement device 140 may investigate material 110 with short pulses of terahertz radiation. As another example, measurement device 140 may use time-of-flight calculations to determine a thickness of material 110 (e.g., a coating thickness). The time-of-flight calculations may be based on the time it takes a pulse to travel to and from material 110.

Analyzer 150 of system 100 may be a processor, such as processor 302 discussed in reference to FIG. 3 below. In certain embodiments, analyzer 150 determines a thickness of material 110 based on one or more properties measured by measurement device 140. For example, analyzer 150 may determine a coating thickness of material 110 using reflectivity data received from a microwave probe. As another example, analyzer 150 may determine a coating thickness of material 110 using time-of-flight measurements received from a terahertz sensor.

In some embodiments, analyzer 150 calculates an adjusted flow rate required to achieve a cured thickness within a predefined number of passes. The first flow rate may need to be adjusted if the measured coating thickness is not equal to the expected coating thickness. The actual coating thickness may vary from the expected coating thickness due to changes in temperature, humidity, the actual material itself, and the like.

The coating thickness may be represented in any suitable unit of measurement. As an example, the actual coating thickness and the expected coating thickness may be represented in mils. As another example, the actual coating thickness and the expected coating thickness may be represented in millimeters. In still another example, the actual coating thickness and the expected coating thickness may be represented using an arbitrary unit (i.e., a relative unit of measurement).

The adjusted flow rate may be calculated based on the first predefined number of passes, an expected thickness of wet material 110 for one pass of the first predefined number of passes, the determined thickness of wet material 110 based on one or more properties measured by measurement device 140, and the first flow rate. In certain embodiments, the equation for flowrate adjustment is:

$$F_{n+1}=(t_{n+1}/t_n) \cdot F_n \quad \text{(Equation 1)}$$

where:
$F_{n+1}$: Flow Rate Adjustment
$F_n$: Current Pass Flow Rate
$t_{n+1}$: Expected Thickness
$t_n$: Measured Thickness In certain embodiments, expected thickness $t_{n+1}$ can be denoted as the number of spray passes multiplied by an expected thickness of each layer of material 110. This allows Equation 1 to be represented as:

$$F_{n+1}=[(n \cdot t_1)/t_n] \cdot F_n \quad \text{(Equation 2)}$$

where:
n: Number of Passes
$t_1$: Expected individual thickness

For example, a cured material thickness of ten mils is required after ten passes. A first flow rate $F_n$ is expected to produce a thickness $t_1$ of one mils per spray pass. After three passes, the measured thickness $t_n$ is 3.5 mils, and analyzer 150 can adjust the first flow rate for the remaining passes by the following amount:

$$F_4=[(n \cdot t_1)/t_n] \cdot F_3$$

$$F_4=[(3 \cdot 1 \text{ Mils})/3.5 \text{ mils}] \cdot F_3$$

$$F_4=0.86 F_3$$

In the above example, since the measured coating thickness of material 110 is 0.5 mils over the expected thickness, the first flow rate will be adjusted to a lower flow rate of $F_4=0.86F_3$ for the remaining passes to achieve 10 mils in the end. The flow rate will remain $F_4=0.86F_3$ as long as the expected (i.e., desired) thickness matches the measured thickness of material 110.

Similarly, if after five spray passes the measured thickness $t_n$ of material 110 is 4.5 mils, analyzer 150 may adjust the second flow rate for the remaining passes by the following amount:

$$F_6=[(n \cdot t_1)/t_n] \cdot F_5$$

$$F_6=[(5 \cdot 1 \text{ mils})/4.5 \text{ mils}] \cdot F_5$$

$$F_6=1.11 F_5$$

Since the measured coating thickness is 0.5 mils under the desired thickness, the flow rate at pass five may be adjusted to a higher flow rate of $F_6=1.11F_5$ for the remaining passes (i.e., passes six, seven, and so on) to achieve ten mils in the end. The flow rate will remain $F_6=1.11F_5$ as long as the desired thickness matches the measured thickness.

Coating delivery system 160 of system 100 is any system that can deliver material 110 to spray gun 130. Coating delivery system 160 may be coupled to one or more components of system 100. For example, coating delivery system 160 may be physically connected to spray gun 130. As another example, coating delivery system 160 may be included in robot 120. In certain embodiments, coating delivery system 160 includes one or more computer systems (e.g., computer system 300) programmed to deliver material 110 to one or more components of system 100 (e.g., spray gun 130).

Human Machine Interface ("HMI") 170 is any interface that facilitates interaction between a user and a machine. For example, HMI 170 may communicate a calculated flow rate to a user. In certain embodiments, HMI 170 is a software application included in robot 120. In some embodiments, HMI 170 utilizes equations 1 and/or 2 discussed above to calculate how much flowrate adjustment will be necessary for the remaining number of passes to achieve the targeted nominal thickness of material 110.

FIG. 2 illustrates a method 200 for adjusting a flow rate of a material, according to certain embodiments. Method 200 begins at step 210. At step 220, a spray gun coupled to a robot sprays a first predefined number of passes of a material (e.g., material 110) onto a substrate (e.g., substrate 180) at a first flow rate (e.g., $F_n$). Method 200 then proceeds to step 230. At step 230, a measurement device (e.g., measurement device 140) measures one or more properties of the material sprayed onto the substrate while the material is wet. For example, the measurement device may measure the reflectivity of the wet material. As another example, the measurement device may determine time-of-flight measurements (e.g., the time to send and receive a terahertz pulse).

At step 240 of method 200, a processor (e.g., analyzer 150) determines a thickness of the wet material based on the one or more measured properties. Method 200 then proceeds to step 250, where the processor calculates a second flow rate required to achieve a cured thickness of the material within a second predefined number of passes. The processor may calculate the second flow rate based on the first predefined number of passes, an expected thickness of the wet material for one pass of the first predefined number of passes, the determined thickness of the wet material, and the first flow rate (e.g., Equation 2). For example, the second flow rate (e.g., $F_{n+1}$) may be calculated by multiplying the first predefined number of passes (e.g., n) by the expected thickness (e.g., $t_1$) to obtain a first value, dividing the first value by the determined thickness (e.g., $t_n$) to obtain a second value, and multiplying the second value by the first flow rate (e.g., $F_n$) to obtain the second flow rate (e.g., $F_{n+1}$).

Method 200 then proceeds to step 260. At step 260, a processor determines whether the calculated second flow rate is different than the first flow rate. If the calculated second flow rate is different than the first flow rate, method 200 proceeds to step 270, where the flow rate is adjusted by one or more components of a system (e.g., system 100). After adjusting the first flow rate to the second flow rate, method 200 proceeds to step 280, where the spray gun (e.g., spray gun 130) sprays the second predefined number of passes of the material onto the substrate at the calculated second flow rate. If the second flow rate is the same as the first flow rate, the flow rate is not adjusted and method 200 proceeds to step 280, where the spray gun sprays the second predefined number of passes of the material onto the substrate at the first flow rate. Method 200 ends at step 290.

Method 200 may include more or less steps than those illustrated in FIG. 2. For example, method 200 may further include determining a second thickness of the wet material after spraying the second predefined number of passes, adjusting the flow rate from the second flow rate to a third flow rate, and spraying a third predefined number of passes of the material onto the substrate at the third flow rate. As another example, method 200 may include prepping the substrate prior to spraying the first predefined number of passes of the material onto the substrate.

FIG. 3 illustrates a computer system 300 that may be used by the system of FIG. 1, according to certain embodiments. One or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302 a memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one, or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure, contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 (e.g., interface 256) includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 (e.g., interface 256) includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

The components of computer system 300 may be integrated or separated. In some embodiments, components of computer system 300 may each be housed within a single chassis. The operations of computer system 300 may be performed by more, fewer, or other components. Additionally, operations of computer system 300 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, comprising:

spraying, by a spray gun coupled to a robot, a first predefine number of passes of a material onto a substrate at a first flow rate;

measuring, by a measurement device, one or more properties of the material sprayed onto the substrate while the material is wet;

determining, by an analyzer, a thickness of the wet material based on the one or more measured properties; and calculating, by the analyzer, a second flow rate required to achieve a cured thickness of the material within a second predefined number of passes, the calculated second flow rate based on:

the first predefined number of passes;

an expected thickness of the wet material for one pass of the first predefined number of passes;

the determined thickness of the wet material; and the first flow rate; and where the one or more properties comprises electrical performance data; and wherein the electrical performance data comprises reflectivity.

2. The method of claim 1, wherein calculating the second flow rate comprises:

multiplying the first predefined number of passes by the expected thickness to obtain a first value;

dividing the first value by the determined thickness to obtain a second value; and multiplying the second value by the first flow rate to obtain the second flow rate.

3. The method of claim 1, wherein the measurement device is a microwave probe and the one or more measured properties are one or more electrical properties.

4. The method of claim 1, wherein the measurement device is a terahertz sensor and the one or more measured properties are one or more time-of-flight measurements.

5. The method of claim 1, wherein the first flow rate and the second flow rate are different.

6. The method of claim 1, further, comprising spraying, by the spray gun, the second predefined number of passes of the material onto the substrate at the calculated second flow rate, wherein the material is paint.

7. The method of claim 1, wherein the measurement device measures the one or more properties of the wet material sprayed onto the substrate without contacting the wet material.

8. The method of claim 1, wherein determining, by an analyzer, a thickness of the wet material based on one or more measured properties, comprises determining the thickness before the wet material has cured.

* * * * *